United States Patent [19]

Friedman et al.

[11] Patent Number: 5,795,456

[45] Date of Patent: Aug. 18, 1998

[54] MULTI-LAYER NON-IDENTICAL CATALYST ON METAL SUBSTRATE BY ELECTROPHORETIC DEPOSITION

[75] Inventors: Semyon D. Friedman, Baltimore, Md.; Martin B. Sherwin, Boca Raton, Fla.; Rasto Brezny, Catonsville; Poovatholil F. Francis, Columbia, both of Md.

[73] Assignee: Engelhard Corporation, Iselin, N.J.

[21] Appl. No.: 600,788

[22] Filed: Feb. 13, 1996

[51] Int. Cl.$^6$ .................................................. C25D 13/02
[52] U.S. Cl. ........................... 204/471; 204/485; 204/490; 204/491; 204/510; 204/512
[58] Field of Search ............................. 204/484, 485, 204/490, 491, 510, 512

[56] References Cited

U.S. PATENT DOCUMENTS

| | | | |
|---|---|---|---|
| 2,658,742 | 11/1953 | Suter et al. | 263/3 |
| 2,826,541 | 3/1958 | Barr et al. | 204/484 |
| 2,966,449 | 12/1960 | Bouchard et al. | 204/181 |
| 3,219,730 | 11/1965 | Bliton et al. | 264/0.5 |
| 3,719,739 | 3/1973 | Thompson | 423/213 |
| 3,787,305 | 1/1974 | Ballard | 204/181 |
| 3,923,696 | 12/1975 | Chart et al. | 252/647 |
| 3,947,340 | 3/1976 | Kawagoshi et al. | 204/181 |
| 4,279,782 | 7/1981 | Chapman et al. | 252/465 |
| 4,288,346 | 9/1981 | Hunter et al. | 252/437 |
| 4,294,726 | 10/1981 | Bozon et al. | 252/462 |
| 4,329,403 | 5/1982 | Baker | 429/35 |
| 4,363,753 | 12/1982 | Bozon et al. | 252/477 R |
| 4,414,023 | 11/1983 | Aggen et al. | 75/124 |
| 4,466,871 | 8/1984 | Kaup et al. | 204/181 N |
| 4,467,050 | 8/1984 | Patel et al. | 502/330 |
| 4,567,117 | 1/1986 | Patel et al. | 429/19 |
| 4,601,999 | 7/1986 | Retallick et al. | 502/314 |
| 4,634,502 | 1/1987 | Callahan et al. | 204/181.5 |
| 4,671,931 | 6/1987 | Herchenroeder | 420/445 |
| 4,673,663 | 6/1987 | Magnier | 502/320 |
| 4,711,009 | 12/1987 | Cornelison | 29/157 R |
| 4,771,029 | 9/1988 | Pereira et al. | 502/355 |
| 4,838,067 | 6/1989 | Cornelison | 72/196 |
| 5,057,483 | 10/1991 | Wan | 502/304 |
| 5,080,882 | 1/1992 | Yoshimoto et al. | 427/579 |
| 5,158,654 | 10/1992 | Yoshimoto et al. | 204/59 R |
| 5,211,822 | 5/1993 | Alary et al. | 204/181.5 |
| 5,232,671 | 8/1993 | Brunson et al. | 60/300 |
| 5,272,125 | 12/1993 | Weible et al. | 502/242 |
| 5,272,876 | 12/1993 | Sheller | 60/300 |
| 5,472,583 | 12/1995 | Kerkra | 4/491 |

FOREIGN PATENT DOCUMENTS

| | | |
|---|---|---|
| 0104903 | 4/1984 | European Pat. Off. |
| 0107352 | 5/1984 | European Pat. Off. |
| 0390321 | 10/1990 | European Pat. Off. |
| 4183898 | 6/1992 | Japan. |
| 9407235 | 3/1994 | WIPO. |

OTHER PUBLICATIONS

P. Nass et al, "Electrophoretic Deposition of Alumina from Non-Aqueous Dispersions". (Publication and Date Unknown).

J. Y. Choudhary et al, "Electrophoretic Deposition of Alumina for Aqueous Suspensions", Trans. J. Br. Ceram. Soc., 81, 193–196 (1982) ( No Month Available).

S. N. Heavens, "Electrophoretic Deposition as a Processing Route for Ceramics", J. Ad. Ceram. Pro. Tech., pp. 255–283. (Date Unknown).

*Primary Examiner*—Kathryn L. Gorgos
*Assistant Examiner*—Kishor Mayekar

[57] ABSTRACT

A method for producing by electrophoretic deposition multi-layer, polyfunctional, catalyst members for use in catalytic converters having a plurality of suitably porous and adherent catalyst support coatings of substantially uniform thickness, a plurality of non-identical catalytic agents imbued therein/on, and a flexible metal substrate, are disclosed. Such process involves maintaining electrical interaction between a metal substrate previously coated with catalyst-catalyst support material, the power source, and the electrodes disposed in the electrophoretic deposition ("EPD") cell containing a slurry of a second catalyst support material and a second catalyst composition non-identical to that found in the first catalytically-active layer.

14 Claims, 3 Drawing Sheets

MULTI-LAYER NON-IDENTICAL CATALYST ON METAL SUBSTRATE BY ELECTROPHORETIC DEPOSITION

FIELD OF THE INVENTION

This invention relates to a method and apparatus for the electrophoretic deposition of multiple catalytically-active layers onto thin metal structures. More particularly, it relates to the use of an electric field to simultaneously drive catalyst support materials and a first catalyst(s) onto a metal substrate in one application step to form a first catalytically-active layer, followed by similar application of a catalyst support material and a second catalyst(s) of different composition to form a second catalytically-active layer, by securing constant electrical contact between the metal substrate and a power supply.

BACKGROUND OF THE INVENTION

Catalytic converters are devices for converting noxious exhaust components into less toxic agents. Catalytic converters conventionally comprise a substrate structure, a catalyst support layer bonded thereto, and one or more catalytically-active agents bonded to the catalyst support layer.

Substrate structures house the catalyst and provide conduits for the exhaust fumes which are to be chemically scrubbed. They have conventionally been fabricated from ceramic material, although the use of thin metal substrates has gained considerable commercial acceptability in recent years owing to the ability of metal substrates to be made in larger cross-sections (as would be needed for the treatment of large gas flows), the ability to manufacture metal substrates which are thinner than ceramic substrates, and the easier fabrication of structures made from metal.

The catalyst support layer is used as a support for the catalyst, and therefore, must have the property of both bonding to the substrate and the catalyst itself. Typically, such catalyst support layer is formed by repeatedly dipping the substrate into a slurry which contains particles of the catalyst support material and drying and/or calcining the resulting coated product. Catalyst support layers manufactured by such a "dipping" technique are customarily referred to as "washcoat." Catalytic converter catalyst support layers are generally comprised of such substances as activated alumina ($Al_2O_3$) (U.S. Pat. No. 4,601,999), silicas, and mixed oxide powders of silica, vanadia and titania (U.S. Pat. No. 5,272,125). In thin metal converters, the catalyst support layer is preferably placed upon the substrate after the substrate has been exposed to heat in an oxidizing atmosphere. Heating of the metallic substrate in an oxidizing atmosphere results in an adherent self-healing oxide diffusion barrier which prevents further oxidation and thus protects the metal core. The barrier also prevents base metal in the core from diffusing into the catalyst support coating.

Several catalysts may be affixed to the catalyst support layer which is bound to the metal substrate forming a catalyst member. The catalyst(s) being employed in any given converter are dependent upon the chemical conversion desired and the temperature range over which the converter will operate. For example, noble metals such as platinum and palladium are often used in the treatment of auto exhaust to promote oxidation of unburned or partially oxidized hydrocarbons and to promote the reduction of nitrogen oxides because of their durability at high temperatures. Metal oxide catalysts, such as those formed with metals of Groups V and VI of the Periodic Table, are frequently employed for vapor phase catalytic oxidation of organic compounds. Catalysts are conventionally adhered to the catalyst support layer by means of liquid-carrier impregnation.

Catalytic converters may be fabricated with either monofunctional or polyfunctional catalyst members. Monofunctional catalyst members are capable of catalyzing only one type of chemical reaction, such as oxidation. On the other hand, polyfunctional catalyst members (ie., a metal substrate coated with catalyst support material bound to a plurality of catalysts) may catalyze a plurality of chemical reactions. Of the polyfunctional catalyst members, the "three-way conversion" ("TWC") catalyst member is frequently employed in the art. TWC catalyst members are polyfunctional in that they have the capability of substantially simultaneously catalyzing the oxidation of hydrocarbons and carbon monoxide and the reduction of nitrogen oxides. TWC catalyst members may comprise either a single or multiple deposition layer of catalyst-impregnated catalyst support material.

U.S. Pat. No. 4,294,726 (the "'726 patent") describes an example of a polyfunctional catalyst member comprising a single layer of catalyst-catalyst support material. The '726 patent discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500° to 700° C. in air after which the material is impregnated with an aqueous solution of a salt of platinum and a salt of rhodium, dried and subsequently treated in a hydrogen-containing gas at a temperature of 250°–650° C. The alumina may be thermally followed by impregnating the treated carrier material with aqueous salts of platinum and rhodium and then calcining the impregnated material.

U.S. Pat. No. 5,057,483, on the other hand, discloses a TWC catalyst member comprised of a catalytic material disposed in two discrete coats on a carrier. The first coat includes a stabilized alumina support on which a first platinum catalytic component is dispersed, and bulk ceria, and may also include bulk iron oxide, a metal oxide (such as bulk nickel oxide) which is effective for the suppression of hydrogen sulfide emissions, and one or both of baria or zirconia dispersed throughout the first coat as a thermal stabilizer. The second coat, which may comprise a top coat overlying the first coat, contains a co-formed (e.g. co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as a activated alumina support.

Likewise, International Application No. PCT/US94/07235 discloses a polyfunctional catalyst member having the capability of substantially simultaneously catalyzing the oxidation of hydrocarbons and carbon monoxide and the reduction of nitrogen oxides in a gas stream over wide temperature ranges. The bottom layer is disclosed to comprise an oxygen storage component, e.g. ceria, in intimate contact with a platinum group metal. The bottom layer composition provides sufficient oxygen storage capacity to enhance CO oxidation and nitrogen oxide reduction at temperatures above about 500° C. The top layer comprises a palladium catalytic component free from intimate contact with an oxygen storage component. The top layer provides sufficient catalytic activity with respect to hydrocarbon and nitrogen oxide conversion during the initial heating of the catalytic converter and at an operating temperature below 500° C. Performance of the catalyst is enhanced in both layers by the use of an alkaline earth metal as a stabilizer, a rare earth metal component as a promoter of the reaction, and a zirconium component to enhance both the stabilizer and promoter. Layering of the bottom layer catalyst composition with the top layer catalyst composition is said to both simplify production of the catalyst substrate and to enhance its efficacy. Exhaust gaseous emissions first encounter the top layer composition where the platinum group metal acts to catalyze the reduction of nitrogen oxides to nitrogen and the oxidation of hydrocarbons. Upon passing through the top layer, the exhaust gas then contacts the bottom layer, where the platinum group metal is in intimate contact with an oxygen storage component thereby enhancing oxidation and reduction reactions at high temperatures.

As disclosed in International Application No. PCT/US94/07235 and U.S. Pat. No. 4,294,726, multi-layer TWC catalyst members have several significant advantages over single layer polyfunctional catalyst members. The primary advantage is that different catalyst/adjuvant compositions can be segregated to such an extent that the exhaust fumes can first react with the outer catalyst layer and then with the inner catalyst layer. Unintended chemical reactivity is significantly reduced by such segregation.

For reasons set forth above, many manufacturers of catalytic converters have begun using metals to form catalytic converter substrate structures. Further, in recent years, many manufacturers have come to favor metal substrates over ceramic substrates because of the widespread incorporation of heaters into catalytic converters to enhance catalysis at relatively low "start-up" temperatures. Metal substrates enhance the efficacy of such heaters owing to their propensity to heat quicker than ceramic materials.

Traditionally, metal catalytic members have been manufactured by dipping the metal substrate into a catalyst support material slurry, drying the resulting coated metal and then impregnating the coated metal substrate with catalyst by means of a catalyst slurry. This traditional method, however, suffers from a number of disadvantages. First the method is time consuming in that it requires that the catalyst support layer be dried prior to application of the catalyst. The method also requires that two slurries be prepared—a catalyst support layer slurry, and a catalyst slurry—increasing the expense involved in the coating process, and the possibility of introduction of error. Additionally, due to the nature of metals, especially the flexibility inherent in thin metal strips, catalyst support material frequently does not adhere well to the metal substrate. Adherence of the catalyst support layer is especially problematic in corrugated metal foils, as corrugations have the tendency to resist uniform coating. Corrugated substrate structures are frequently employed in catalytic converters today since they increase surface area for increased reactivity between the exhaust gases and the catalyst. Catalyst support material applied to corrugated converter structures by "dipping" often preferentially collects in the negative radius of curvature areas of the structure (valleys or crevices). This preferential collection results in a catalyst support layer of non-uniform thickness.

In order to avoid the problems associated with "dipping" metal substrates into slurries, it has been suggested that electrophoretic deposition be employed to deposit catalyst support materials onto the metal substrate.

While several attempts have been made to use electrophoretic deposition in the fabrication of metal substrates coated with catalyst support materials, it is not believed that heretofore electrophoretic deposition has been used to produce a commercially acceptable catalyst support layer on such substrates. In co-pending U.S. patent application Ser. No. 08/600,585, filed Feb. 13, 1996, pending however, a system employing electrophoretic deposition which provides for an acceptable metallic-substrate based catalytic converter is described. Such system encompasses contacting a metal foil with an aqueous slurry of catalyst support material and catalyst, placing an electrode in contact with said slurry, applying an electric field between the metal foil and the electrode whereby the foil becomes a cathode and the electrode an anode, maintaining the electric field for a time sufficient to cause deposition of at least some of the catalyst support material and catalyst onto the metal foil, removing the coated foil from the electric field, and drying the coated foil.

While electrophoretic deposition has the potential to significantly improve the production of metal catalytic members, conventional electrophoretic deposition, as well as that described in co-pending U.S. patent application Ser. No. 08/600,585, filed Feb. 13, 1996, pending does not lend itself to the formation of multi-layer catalyst members. The latter is a result of the electrophoretic process itself, wherein the metal is coated with minimally electrically-conductive material. The coating inhibits further deposition of material onto the metal after a certain coating thickness is achieved. That is, the first catalyst-impregnated support material layer, a significant part of which is generally ceramic support, forms a dielectric barrier upon application onto the metal substrate which prohibits further deposition of material. As presently known in the art, the only viable method for applying a second catalyst-impregnated catalyst support material layer to an electrophoretically-deposed catalyst member is to "dip" the dried member into a second catalyst support layer slurry, and then to impregnate the same with catalyst.

A method of electrophoretically depositing a plurality of layers onto a metal substrate would significantly improve the efficiency of production of multi-layer polyfunctional metal catalyst members by reducing the laborious steps of: removing the electrophoretically-deposited catalyst member from its support, drying the catalyst member, contacting it with a slurry of catalyst support material, drying, and then impregnating with a second (third, fourth, etc.) catalyst system. Such a method would further improve the uniformity of any second (third, fourth, etc.) layer applied to the first (or subsequent layer), significantly reducing waste product.

It recently has been discovered that multi-layer catalyst members can be formed without performing such laborious steps. The latter is accomplished by means of maintaining electrical interaction between the metal substrate which has been coated, the power source, and the electrodes disposed in the electrophoretic deposition ("EPD") cell containing the slurry of catalyst support material and catalyst which are to form a layer on top of the first layer. Maintenance of electrical interaction may be by means of masking certain sections of the foil prior to the first layer deposition, and then unmasking these sections after deposition to permit an electrical contact between the metal substrate and the power source to allow a second layer deposition. More preferably, however, electrical interaction is maintained between the foil, the power source and the electrodes by point penetration through the first layer, thereby maintaining electrical contact between the foil and the negative terminal of a power supply. Such method permits the foil to remain acting as the cathode to the bath electrodes (anodes). The latter method further provides for the continuous deposition of multi-layer nonidentical catalysts onto the metal substrate, without the need (as in the first method) from stopping the production line and removing the masking.

SUMMARY OF THE INVENTION

This invention provides for the more efficient, economical and streamlined manufacture of multi-layer, polyfunctional, catalyst members for use in catalytic converters. Such members have a plurality of suitably porous and adherent catalyst support coatings of substantially uniform thickness, a plurality of non-identical catalytic agents imbued therein/on, and a flexible metal substrate. The invention further provides a new process using aqueous electrophoretic deposition to form multi-layer TWC catalyst members comprised of metal substrates. Such process involves maintaining electrical interaction between the metal substrate which has been coated, the power source, and the electrodes disposed in the electrophoretic deposition ("EPD") cell containing the slurry of catalyst support material and catalyst which are to form a layer on top of a preceding layer.

The invention encompasses an apparatus and method of forming multi-layer, catalytically-active, metal substrate members, such members comprising (1) a metal foil substrate having first and second primary surfaces and an edge surface, (2) a first porous catalyst support layer on the first primary surface, (3) a first catalyst adhered to the first support layer, (4) a plurality of second porous support layers on top of said first catalyst support layer, (5) a plurality of second catalysts adhered to said plurality of second porous catalyst support layers. The method comprises:

(a) preparing a first slurry of particles of a first catalyst and first catalyst support material, the slurry pH being such that the particles have a surface charge, preferably a positive charge.

(b) contacting a metal foil having a first and second primary surface and an edge surface with the first slurry whereby at least a portion of the first primary surface is in contact with the slurry, (c) placing an electrode in contact with the first slurry in an electrophoretic deposition cell, (d) contacting the foil with an electrical contact, such contact being coupled to a power source, (e) applying an electric field between the foil and the electrode whereby an electrode potential is created on the foil, which electrical potential is opposite to the electrical potential on the particles in the slurry.

(f) maintaining the electric field for a time sufficient to cause deposition of at least some of the particles of the first catalyst and catalyst support material on the first primary surface thereby forming a foil coated with a first layer of catalyst support material impregnated with a catalyst, (g) removing the foil having the first layer deposited thereon from the electrophoretic deposition cell, (h) drying the foil having the first layer deposited thereon, (i) optionally calcining, (j) preparing a second slurry of particles of a second catalyst and catalyst support material, the slurry pH being such that the particles have a surface charge, (k) replacing the first slurry in the electrophoretic deposition cell with the second slurry, (l) maintaining electrical interaction between the foil coated with the first layer, the power source terminal attached to the foil, and the electrodes disposed in the electrophoretic deposition cell, (m) applying an electric field between the foil coated with the first layer and the electrode in the electrophoretic deposition cell whereby an electrical potential is created on the foil which electrical potential is opposite to the electrical potential on the particles in the slurry, (n) maintaining the electric field for a time sufficient to cause deposition of at least some of the particles of the second catalyst and catalyst support material on the first layer thereby forming a foil coated with a second layer of catalyst support material impregnated with a catalyst, (o) removing the foil having the first and second layer deposited thereon from the electrophoretic deposition cell, (p) drying the coated foil, (q) optionally calcining, and (r) repeating steps h–q to deposit on the foil any further layers desired.

The method of the invention may be conducted as batch or continuous operations. These and other aspects of the invention will be described in further detail below.

DETAILED DESCRIPTION OF THE INVENTION

The catalytically-active, metal substrate member, of the invention contains a suitably porous and adherent first catalyst support layer of substantially uniform thickness, with one or more catalytic agents imbued thereon/in, such first layer being deposited on a metal foil substrate, and a suitably porous and adherent second catalyst support layer of substantially uniform thickness, with one or more catalytic agents imbued thereon/in, forming a second layer on top of the first layer. With respect to the first layer, the layer is situated on the metal foil substrate either directly or with an intervening thin oxide coating.

Figure 1:
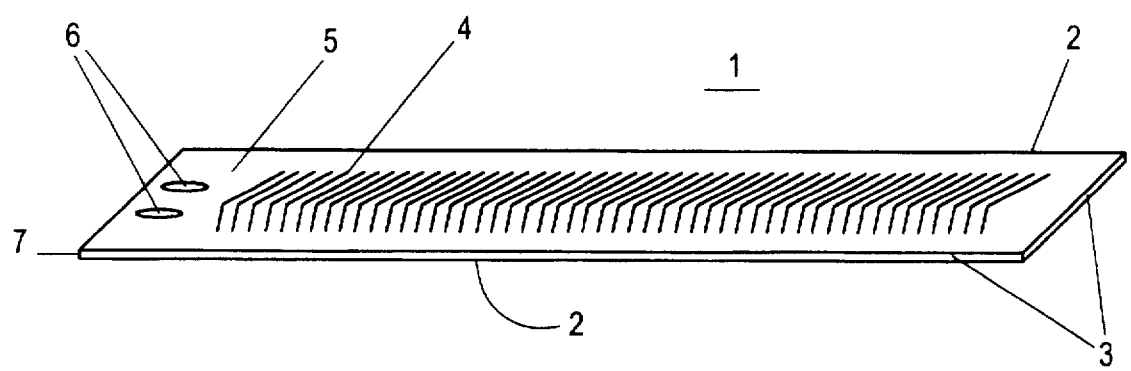
FIG. 1 shows a conceptual view of a corrugated metal foil substrate with the foil thickness exaggerated for ease of illustration.

Referring to FIG. 1, metal foil substrate 1 has primary surfaces 2, edge surface 3, and lateral surface 7. The foil may also have corrugations 4 on some or all regions. Corrugations are typically employed as a means of increasing the available surface area for catalytic activity, to alter the gas flow through the converter, etc. In many instances, it may also be desirable to have non-corrugated regions 5 for purposes such as brazing, electrical contact or mechanical attachment. If desired, the foil may also contain perforations 6 which may be useful in handling the foil during processing as well as for alignment and assembly in the converter device. The invention is not limited to any specific foil design or shape. If desired, the foil may be treated as a continuous length of foil which is subsequently cut into individual foil substrates (or catalyst members) at a desired stage in the overall process of manufacture.

The substrate's dimensions will generally be dictated by converter design considerations, commercial availability of metal stock, etc. Typical foils are described in U.S. Pat. Nos. 5,272,876; 4,838,067; 4,601,999; and 4,414,023. Foil thickness 7 for most catalytic converter designs ranges from 0.02–0.25 mm. Thinner foils are generally preferred since they can provide increased available surface area per unit volume. The primary surface dimensions of the foil are also largely dependent on design considerations, handling considerations, etc.

While the invention is not limited to specific metal foil compositions, ferritic or nickel alloys are generally preferred. Preferably, the metal foil composition contains at least a minor amount of a metal which, when oxidized will act to facilitate adherence of the catalyst support material to be deposited. Thus, for alumina-containing catalyst support materials, metal foil compositions which contain aluminum are preferred. Typical foil compositions often contain combinations of aluminum, chromium, nickel and/or iron with minor amounts of other elements.

Figure 2:
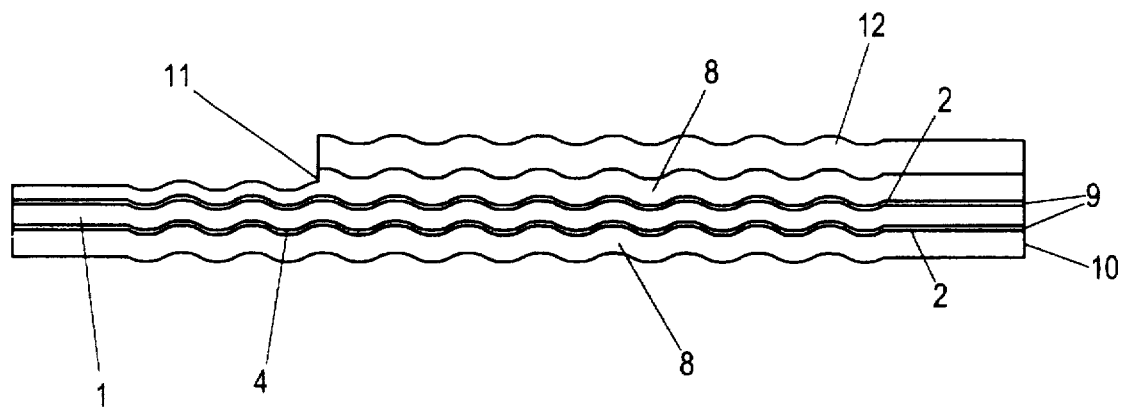
FIG. 2 shows a cross-sectional view of corrugated metal foil coated according to the invention.

Now referring to FIG. 2, there is shown a cross-sectional view of corrugated metal foil of FIG. 1 coated according to the invention. First catalyst-impregnated catalyst support layer 8 may be in direct contact with metal foil primary surface 2. Preferably, however, layer 8 is in direct contact with a thin oxide film 9 which directly contacts the metal foil primary surface 2. Layer 8 may cover the entire surface of metal foil 1 or may cover only selected regions of the foil. If desired, layer 8 may cover one primary surface or both primary surfaces. Preferably, the corrugated regions 4 are entirely covered with thin layer 8. It is also preferred that some or all of the edge surface 3 be covered by layer 8. Layer 8 may be present as a continuous layer or may be interrupted such that exposed regions of the metal foil are surrounded by continuous regions which are covered by layer 8.

Catalyst-impregnated catalyst support layer 8 preferably has substantially uniform thickness 10 in all regions where it is present on the metal foil substrate 1. In some instances, it may be possible to have layer 8 exist in different discrete thicknesses such that step-like differences 11 in thickness would exist. By use of electrophoretic deposition, as discussed below, it is possible to limit the variation in support thickness such that there is less than about 10%, (more preferably about 5% or less and most preferably about 2%) difference in thickness (measured as the greatest support thickness divided by the smallest support thickness) across the entire catalyst support layer 8 (except for possible step-wise differences.)

The catalyst support layer material preferably comprises one or more ceramic oxides. The ceramic oxide is preferably selected from the group consisting of alumina, ceria, baria, titania, zirconia, lanthanum oxide, other rare earth oxides, and mixtures thereof. The catalyst support layer may be designed to contain variations of composition and/or porosity through the thickness of the layer. Preferably, the loading of support on the substrate is about 5–80 mg per square inch of coated surface, more preferably about 15–50 mg/in$^2$, and most preferably 15–30 mg/in$^2$.

Catalyst-impregnated catalyst support layer 8 comprising a ceramic oxide support material preferably has (i) a surface area of about 100–300 m$^2$/g based on the weight of the ceramic oxide contained therein, more preferably about 150–250 m$^2$/g, and most preferably 200–250 m$^2$/g. (ii) pore volume of about 0.5–1.0 cc/g, more preferably about 0.70–1.0 cc/g, and most preferably 0.8–1.0 cc/g and (iii) a thickness of about 10–60 µm, more preferably about 20–40 µm, and most preferably 20–30 µm. The coherence of the deposited particles is preferably such that the coating is not chalky. The adhesive strength of the catalyst support layer is preferably such that the substrate can be flexed during normal processing and use without delamination of the support layer.

If present, the thin oxide film may cover all or portions of the metal substrate surface. The film preferably intervenes between the metal substrate and the catalyst support layer over the entire area of the catalyst support layer. There may be instances in which portions of the substrate are covered by the catalyst support layer, but not the thin oxide film layer. There may also be instances where the thin oxide film exists on portions of the metal substrate without any coverage by the catalyst support layer.

The thin oxide film layer preferably has a thickness of about 50–5000 Å, more preferably about 100–2000 Å, and most preferably about 500–2000 Å. Preferably, the thickness of thin oxide film layer is substantially uniform. The thin oxide film composition preferably contains a metal oxide which is also present in the catalyst support material to be deposited or which facilitates adherence of the catalyst support material to the substrate. Thus, for alumina-containing catalyst support materials, the thin oxide film compositions preferably contain alumina. The thin oxide film is preferably formed by oxidation of the underlying metal foil. In such cases, the film will contain oxides of the metals in the foil. The ratio of molar metal oxides in the foil may vary from the molar ratio of the corresponding metals in the oxide film due to differences in diffusion rates of the various metals.

First catalytically active species are dispersed uniformly throughout and on the first catalyst-impregnated catalyst support layer 8 which is typically porous. The catalytically active species may be any known species or combination thereof. Typically, precious metals such as platinum, palladium and/or rhodium are used. The loading of catalyst is preferably at levels conventionally used in the art (e.g. 20–200 g/ft$^3$). In some instances, due to the uniformity of the catalyst support layer thickness, it may be possible to use less catalyst for the same effective activity level as would be achieved using other catalyst support techniques.

On top of the first catalyst-impregnated catalyst support layer 8, is disposed a second catalyst-impregnated catalyst support layer 12 of similar catalyst support material as in first catalyst-impregnated catalyst support layer 8. A second catalytically active species, preferably different from those of first catalyst-impregnated catalyst support layer 8, are impregnated in second catalyst-impregnated catalyst support layer 12.

Figure 3:
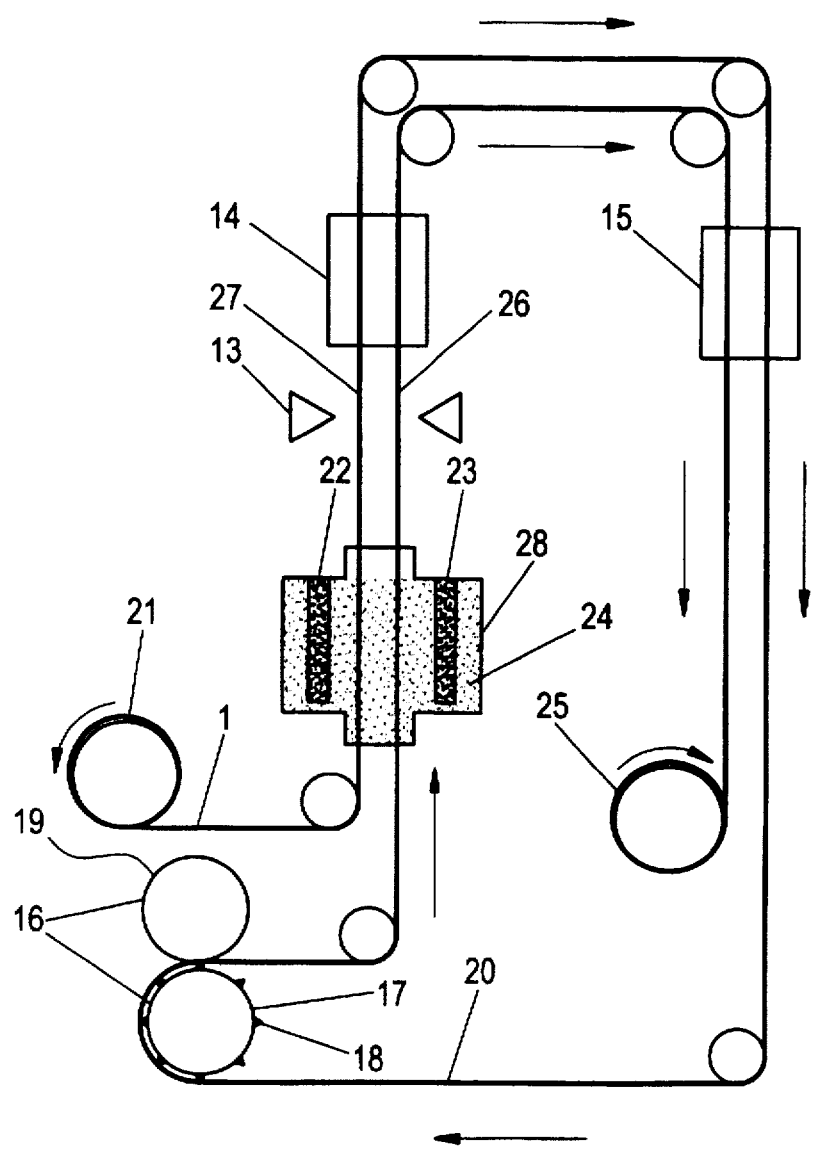
FIG. 3 illustrates a cross-sectional view of a system employing the method of the present invention.

Referring now to FIG. 3, there is shown a schematic of the present invention whereby catalyst support material with catalyst is deposited in one-step by electrophoretic deposition in electrophoretic cell 28 onto thin metal substrate 1 to form first catalyst-impregnated catalyst support layer 8. Metal form substrate 1 is provided from de-reeling station 21 and is feed through electrophoretic cell 28 having anode 22 and cathode 23 and electrophoretic solution 24, comprising a first catalyst and catalyst support material aqueous slurry. The excess slurry on the thin coated metal substrate is removed by means of air knives 13. The coated thin metal substrate 27 is then dried by dryer 14, and subsequently passed through calciner 15. After passing through calciner 15, the coated, dried, and calcined thin metal substrate 20 is then returned to electrophoretic cell 28 through contact rolls 16. Contact rolls 16 are comprised of electrical contact roll 17 which is surrounded by a plurality of coat-piercing electrical contacts 18 on its perimeter, and rubber roll 19. Coat-piercing electrical contacts 18 provide for piercing of the coat(s) on coated, dried, and calcined thin metal substrate 20, thereby maintaining electrical contact between the negative terminal of the power source and the foil. Rubber roll 19 provides for frictional interaction with electrical contact roll 17 to provide for lateral movement of the foil substrate and piercing of the coat on coated, dried, and calcined thin metal substrate 20. Metal substrate 20 is fed through electrophoretic cell 28 filled with electrophoretic solution 24 this time comprising a second catalyst and catalyst support material aqueous slurry. Alternately, metal substrate 20 may be fed through a second electrophoretic cell pre-filled with said second catalyst and catalyst material aqueous slurry. The doubly coated metal substrate 26 is then dried by dryer 14, subsequently passed through calciner 15 and uptaken into uptake roll 25.

Figure 4:
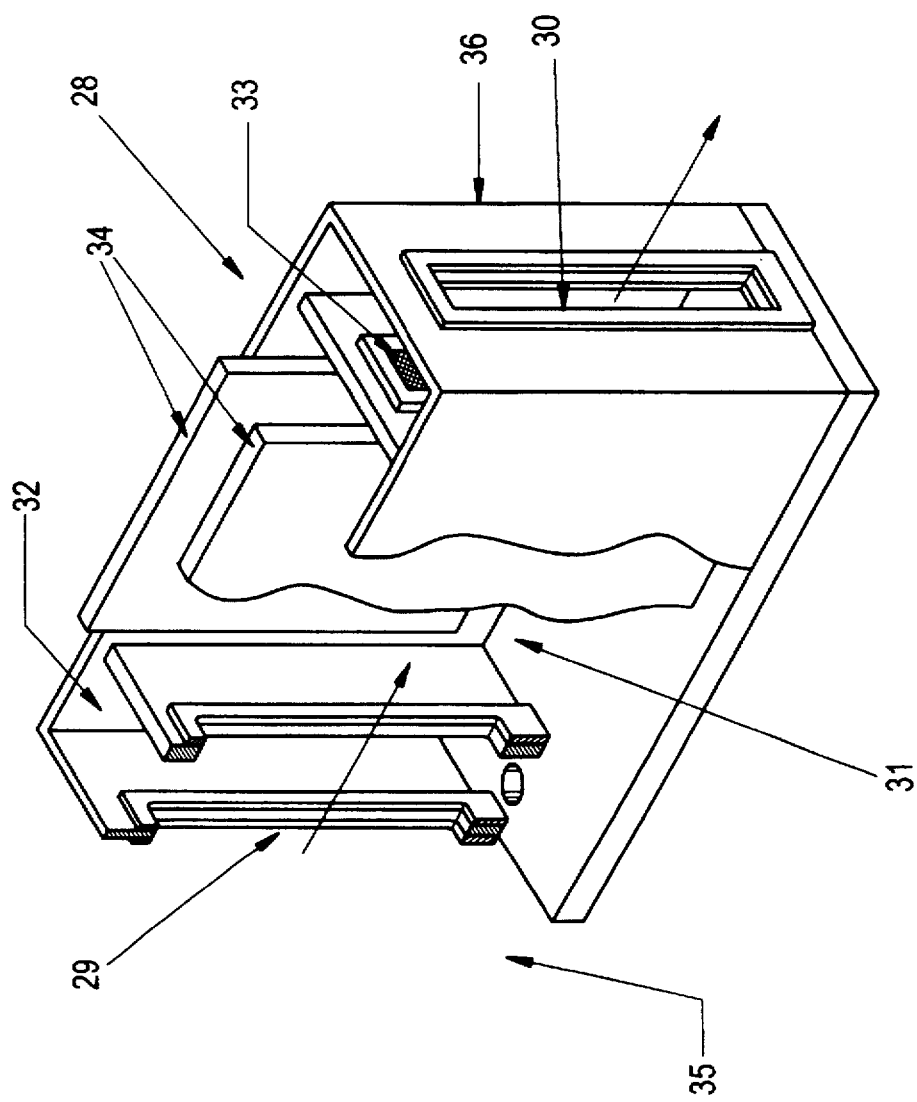
FIG. 4 depicts in a perspective view an electrophoretic cell utilizable in the present invention.

Referring now to FIG. 4, there is shown a perspective view of an embodiment of electrophoretic deposition cell 28. Electrophoretic deposition cell 28 comprises housing 36, which may be fabricated from polypropylene, electrodes 34 which act as anodes to thin metal substrate 1 (not shown) when thin metal substrate 1 is electrically coupled to become a cathode, main slurry chamber 31 for retaining the catalyst-catalyst support material slurry, overflow slurry chamber 32 for housing slurry overflow from main slurry chamber 31 and shunting the overflow through slurry outlet 35, thin metal substrate inlet port 29 (partial view), thin metal substrate exit port 30, and rubber seal 33 for aiding in removing excess slurry from the electrophoretically disposed thin metal substrate.

Metal foils typically come from the supplier in wound rolls. Depending on the method of foil manufacture, the foil may have residual stresses associated with the working of the metal. Metal foil stock also may contain an extremely thin surface oxide coating (i.e. <30 A). If desired, the foil may be treated with an initial annealing step such as that disclosed in U.S. Pat. No. 4,711,009 in order to lessen the amount of residual stress.

If the foil is to be corrugated, the corrugating would typically follow the annealing (if done). Corrugation may be performed by any suitable method known in the art to form whatever corrugation pattern is desired. The foil is then preferably treated to remove any lubricant (associated with the corrugation process) and is annealed to remove stresses from the corrugation step. The lubricant may be removed by washing with an appropriate solvent or detergent. More preferably, however, the lubricant is burned off in the initial stages of the subsequent annealing step.

While the process of the invention can be practiced with an untreated foil, preferably the foil is pre-treated at some point before the electrophoretic deposition step to enhance the adherence of the subsequently deposited catalyst-impregnated catalyst support material layer. While abrasion of the surface has been disclosed in the prior art as enhancing adhesion, a preferred pretreatment is to grow a thin oxide film on the foil surface by firing the foil in a mildly oxidizing atmosphere for a brief period of time.

The oxidizing treatment is preferably carried out at about 800°–950° C. (more preferably about 875°–925° C., and most preferably about 900°–925° C. in an atmosphere having an oxygen partial pressure of about 0.1–0.3 atm (preferably about 0.2 atm) for about 0.5–3 minutes (preferably about 1–2 min.). If desired, the milder or more severe oxidizing environments can be used with appropriate changes in firing time. The oxide film thickness is preferably about 50–5000 A, more preferably about 100–2000 A and most preferably about 500–2000 A. The oxide film grows by oxidation of metals in the metal foil as they diffuse to the surface. Depending on the oxidizing conditions, the actual oxide composition of the film may differ from the metal foil bulk significantly in terms of the proportions of the various metals in the oxides as compared with the actual foil composition. Thus, for example, where aluminum is present in the foil in a minor proportion, aluminum oxide may nevertheless form the bulk of the oxide film since aluminum has a comparatively high diffusion rate. While the mechanism by which the film improves adhesion has not been fully understood, it appears that the adhesion improvement is greatest when the oxide film contains, at its outermost surface, a predominant amount of an oxide which is also used in the catalyst-impregnated catalyst support layer. Preferably, the thin oxide film is of substantially uniform thickness over the entire surface of the metal substrate.

If it is desired to avoid deposition of the catalyst-impregnated catalyst support layer on certain portions of the metal foil substrate, those portions of the foil may be pre-coated with a water-insoluble organic masking material. The masking material is preferably applied as a liquid which solidifies prior to contact of the foil with the deposition slurry. The masking is removed at an appropriate time.

The deposition conditions are preferably selected so as to deposit the desired amount of catalyst support material and catalyst in a very short period of time. The total deposition time is preferably 15 seconds or less, more preferably 5 seconds or less. The use of extremely short deposition times has been found to enhance the adhesion strength and coherence of the deposit while minimizing disruptive effects associated with electrolysis of water at the foil surface. Surprisingly, it has been found that the use of high deposition current density actually acts to minimize the adverse effects of electrolysis while producing a deposit having good porosity, adhesion and cohesion properties.

The deposition is preferably carried out at constant current density where a batch deposition process is employed, or at constant voltage where a continuous length of foil is passed through a deposition bath. It is possible to vary both voltage and current density if desired. In general, it is preferred to use either constant current or constant voltage so the amount of deposition can be controlled by control of the deposition time. Since the effective resistivity of the deposition electrode increases with the amount of deposit, a constant current density mode would require increasing voltage over the time of deposition. Correspondingly, if the voltage is held constant, the current density would decrease with the time of deposition.

The current density preferably ranges from about 0.12–5 amp/in$^2$, more preferably about 0.3–3 amp/in$^2$, and most preferably about 0.3–1.0 amp/in$^2$. The applied voltage necessary to achieve this current density will depend on the resistivity of the deposition bath, the resistivity of the deposition electrode, the mobility and charge of the particles, etc. Typically, the applied voltage is about 0.1–70 volts depending on these various factors. The deposition rate is preferably such that about 5–50 mg/in$^2$ (more preferably about 15–40 mg/in$^2$, and most preferably about 15–30 mg/in$^2$) is deposited. Preferably, the total deposition is accomplished in about 5 seconds or less deposition time. The deposition may be accomplished in a single run or may be accomplished in several shorter runs.

Preferably, the particles in the slurry (other than those actually being deposited) are maintained in a dispersed state throughout the deposition by agitation of some sort. Slurry compositions used in the present invention preferably use water as the dispersion medium. However, it is within the scope of the invention to use an organic solvent based system, such as for example, an organic alcohol. However, it is noted that the organic solvent system might require a higher voltage for electrical deposition than the aqueous system.

The actual slurry compositions used in the invention preferably contain the catalyst support particles, the catalyst itself, deionized water, and a pH adjusting agent. The slurry may include aluminum hydroxide colloidal particles which are believed to improve the coherence of catalyst support particles. The pH is adjusted so as to ensure the desired polarity of surface charge on the catalyst support particles and catalyst. The pH is preferably adjusted by addition of a mineral acid such as nitric acid. For deposition of materials such as alumina on the cathode, the pH is preferably about 2-5, more preferably about 2.5-3.5. Solids content of the slurry is also preferably kept at about 15-50 wt. %.

After the desired numbers of deposit have been achieved, the coated foil is removed from the bath. Excess slurry is removed from the foil to avoid segregation of residual slurry which clings to the foil. The removal of excess slurry may be performed by using air knives, a rinsing bath or other known means. The foil is then dried. Preferably, the foil is also calcined. The drying and calcining conditions used may be any conventional conditions such as those disclosed in U.S. Pat. No. 4,711,009.

If any masking has been applied to the foil, the masking is preferably removed by oxidation during the calcination.

The resulting multi-layer, catalyst-coated foil can then be assembled into a desired converter design.

The invention, however, is further illustrated by the following example. It should be understood that the invention is not limited to the specific details of the example.

EXAMPLE 1

A catalyst slurry containing palladium as a catalytically-active agent and comprised also of mixed oxides (alumina, ceria) was adjusted by addition of acetic acid solution to pH of about 2.9 and solids content of 27.5%. The slurry was then placed in an agitated deposition bath.

A continuous aluminum-chromium-iron alloy foil strip (Alpha IV sold by Allegheny Ludlum Corp.) was treated at 900° C. and 0.2 atm oxygen for one minute to form thin oxide film on both sides of the foil. The foil was then passed through the deposition bath and an electrical field was applied such that the foil was made to be a cathode with the other electrodes (already in contact with the deposition bath) as anodes. The effective length of the foil cathode in the deposition bath was about one foot. The foil was passed through the bath at a line speed of 10 ft./min. The deposition was performed at a constant voltage of about 25 volts at a cathode-anode separation of 2 inches. The average current density over the foil was about 0.5 amp/in$^2$. The foil with the resulting deposit was rinsed in deionized water and excess liquid was removed using air knives. The resulting catalyst support layer imbued with palladium catalyst was dried and calcined at 950° C. for 30 seconds.

The resulting coated catalytically-active metal substrate strip was run again through the agitated deposition bath, this time housing a second catalyst slurry containing platinum and rhodium catalysts and also comprised of mixed oxides (alumina, ceria). The pH of the slurry was adjusted to about 3.6 by addition of nitric acid, and solids content was brought to 40%. Electrical contact was maintained between the coated catalytically-active metal substrate strip and the negative terminal of the power supply by means of a contact roll equipped with sharp protrusions in frictional contact with a rubber roll. An electrical field was applied such that the foil was made to be a cathode with the electrodes already in contact with the deposition bath being anodes. As before, the effective length of the foil cathode in the deposition bath was about one foot and the foil was passed through the bath at a line speed of 10 ft/min. The deposition was performed at a constant voltage of about 15 volts at a cathode-anode separation of 2 inches. The average current density over the foil was about 0.30 amp/in$^2$. Excess liquid was removed from the foil coated with the resulting second deposit layer using air knives. The resulting catalyst support layer impregnated with platinum and rhodium catalysts was dried and calcined at 550° C. for 30 seconds.

The multi-layer, catalytically-active metal substrate was analyzed by x-ray fluorescence, the elements in the specimen being identified by the wavelength of spectral lines emitted, and the concentrations of such elements being determined by the intensities of the lines. Cross-sectional microprobe mapping was subsequently undertaken to characterize the distribution of the components in the deposited layers, and porosity was determined by mercury porosimetry. Such measurements, in conjunction with catalyst activity testing, evidenced a multi-layer catalyst-coated foil strip with a substantially uniform catalyst coating in each layer, and having porosity and catalytic activity comparable to that found in commercially available multi-layer, catalytically-active metal substrates of similar composition.

What is claimed is:

1. A method of forming a catalytically-active metal substrate member comprising:
   (a) preparing a first slurry of particles of a first catalyst and first catalyst support material,
   (b) contacting a metal foil having a first and second primary surface and an edge surface with said first slurry such that at least a portion of said first primary surface is in contact with said slurry,
   (c) placing an electrode in contact with said first slurry in an electrophoretic deposition cell,
   (d) contacting said foil with an electrical contact, said contact being coupled to a power source,
   (e) applying an electric field between said foil and said electrode to create an electrical charge on the foil and on the particles in the slurry, which electrical charge on the foil is opposite to the charge on the particles in the slurry,
   (f) maintaining said electric field for a time sufficient to cause electrophoretic deposition of at least some of said particles of said first catalyst and catalyst support material on said primary surface to form a foil coated with a first layer of said first catalyst support material impregnated with said first catalyst,
   (g) removing said foil having said first layer deposited thereon from said electrophoretic deposition cell,
   (h) drying said foil having said first layer electrophoretically deposited thereon,
   (i) optionally calcining said foil having said first layer electrophoretically deposited thereon,
   (j) preparing a second slurry of particles of a second catalyst and second catalyst support material,
   (k) replacing the first slurry in the electrophoretic deposition with the second slurry, (l) maintaining electrical interaction between said foil coated with said first layer, the power source attached to the foil, and the electrode disposed in said electrophoretic deposition cell, (m) applying an electric field between said foil coated with said first layer and said electrode in said electrophoretic deposition cell to create an electrical charge on the foil and on the particles in the slurry which charge on the foil is opposite to the electrical charge on the particles in the slurry, (n) maintaining said electric field for a time sufficient to cause electrophoretic deposition of at least some of said particles of said second catalyst and catalyst support material on the first layer to form a foil coated with a second layer of said second catalyst support material impregnated with said second catalyst, (o) removing said foil having said first and second layer electroporetically deposited thereon from said electrophoretic deposition cell, (p) drying said coated foil from step (o), and (q) optionally, calcining said dried coated foil from step (p).

2. The method of claim 1 further comprising pretreating said metal foil to make at least a portion of said primary surface receptive to the adherence of the subsequently deposited particles of said first catalyst and first catalyst support material.

3. The method of claim 2 wherein said pretreatment comprises contacting said foil with an oxidizing atmosphere to form a metal oxide film on at least a portion of said primary surface.

4. The method of claim 2 wherein said pretreatment comprises heating s aid foil to about 800°–950° C. for about 0.5–3.0 minutes in an atmosphere having an oxygen partial pressure of 0.1–0.3 atm.

5. The method of claim 1 wherein said contacting step (b) comprises immersing said foil in said slurry.

6. The method of claim 1 wherein, prior to said contacting step (b), at least a portion of said first primary surface is coated with a masking layer to prevent adhesion of subsequently deposited particles on said masked portion.

7. The method of claim 6 wherein said masking is removed after step (g) to yield a brazable surface portion on said foil.

8. The method of claim 1 wherein said first slurry is agitated during step (f).

9. The method of claim 8 wherein said first slurry is flowed countercurrent to the direction of foil passage.

10. The method of claim 1 wherein said contacting step (b) comprises passing said foil through said slurry.

11. The method of claim 9 wherein said foil is in the form of a continuous ribbon which is cut into individual members after said deposition.

12. The method of claim 1 further comprising repeating steps h–q to form a plurality of layers.

13. The method of claim 1 wherein both slurries have a pH such that said particles have a positive charge.

14. The method of claim 1 wherein in steps (e) and (m) the electrical field is applied between the foil acting as a cathode and the electrode acting as an anode.

* * * * *